UNITED STATES PATENT OFFICE.

GEORGE E. WHIPPLE, OF WESTFIELD, MASSACHUSETTS, ASSIGNOR TO UNITED STATES WHIP COMPANY, OF WESTFIELD, MASSACHUSETTS, A CORPORATION OF MAINE.

PROCESS OF MANUFACTURING WHIP-CORES.

983,791. Specification of Letters Patent. Patented Feb. 7, 1911.

No Drawing. Application filed July 16, 1906. Serial No. 326,525.

*To all whom it may concern:*

Be it known that I, GEORGE E. WHIPPLE, a citizen of the United States of America, residing at Westfield, in the county of Hampden and State of Massachusetts, have invented new and useful Improvements in the Process of Manufacturing Whip-Cores, of which the following is a specification.

Heretofore whip cores have been made of whalebone and from hides of animals, from metal and from ratan. Such cores when made from the hides of animals have been found defective, regardless of the method of treatment, because of the impossibility of producing a core which has the hardness, elasticity and life of whalebone, and the scarcity and expense of whalebone renders the employment of this material for whip cores practically prohibitive, and whip cores of ratan and metal are objectionable because brittle and lacking "life".

I have discovered that fish skin, especially the skin of the fish of the species known as *Sirenia*, among which are the dugong and the manatee, have a skin well adapted to produce the desired result when the same has been treated as herein set out. I find that fish skins, especially those of the kind herein referred to, are of a very close texture and are the most nearly allied in fibrous structure to whalebone of any hide or skin thus far discovered.

The method of procedure and treatment to convert the fish skins into whip cores is as follows:—I first subject the skins to a pickling in a solution of lime water. This destroys all bacteria which at times are found in the skins. The skins should remain in this solution for a period sufficient to insure the destruction of all bacteria and to have the desired preserving effect, and I find that usually a period of about ten hours gives the desired result, although with some skins a lesser period is sufficient, and the leaving of the skins in this solution for a longer period has no injurious effect, so that I prefer to leave the skins in the lime solution until I am ready to subject the same to the next step which, by preference, consists in reducing the fish skin to narrow strips preferably of about three-sixteenths of an inch in thickness and about five-sixteenths of an inch in width. These strips are deposited in a solution of potash (about 1 lb. of potash to 50 gals. of water) which causes the material to swell and expand resulting in the opening of all the pores or interstices. The strips should be left in this solution until they are softened and expanded to the desired extent. The time required may be anywhere from three to fifteen hours, depending upon the strength of the solution, the texture of the skin and the resulting hardness desired. The strips are then removed and washed, and deposited in a solution made up of one of the coal tar products known as "indulins", this being rendered soluble in water by treatment with sulfuric acid, and I find a better result follows where this is dissolved in warm water. The strips should remain in this solution from one to five days, depending, as before, upon the strength of the solution, texture of the skin and result desired.

When the material is removed from the last solution the strips will be found to be thoroughly permeated with the solution and will be colored black throughout, and will have taken on a close fibrous appearance in texture. The strips are then, while in the softened and expanded condition, stretched lengthwise as much as they will reasonably stand without rupture of any of the fibers, and are then deposited in a drying room and kept stretched until dry. The stretching, and drying while stretched, prevents distortion, buckling, twisting, etc. The result is the production of a very hard, elastic and tough strip of material of the requisite length having the feel, toughness, life and appearance of a piece of whalebone, free, however, from its tendency to sliver or split. The strips may then be subjected to lateral pressure to give them the desired shape in cross section, after which they are exteriorly finished as may be desired by removing all uneven projections, and are tapered for the whole or any part of their length if desired, all of which results in the production of a core for whips made of a newly discovered material adapted for that purpose, and possessing all the advantageous properties of a whip core made of whalebone, and being free from the disadvantages of that material because of the absence of the tendency to split and splinter, and being produced at a cost of less than one-tenth of the cost of a whalebone core.

The lateral pressure for compressing the strips herein referred to is pressure in a direction parallel with the plane of the surface or scale side of the skin as contradistinguished from pressure or compression in the direction of the outer surface of the skin toward the inner surface. The skin is usually of less thickness than the finished product and in order to attain the requisite thickness and solidity compression is applied as above stated.

Of course, the well known chemical equivalents, although unknown to me, might be substituted for the chemicals herein specified without departing from my invention, but so far as now known to me the best results are attained by the use of the chemicals herein specified.

Having therefore described my invention, what I claim and desire to secure by Letters Patent, is—

1. The method of treating fish skin in preparing it for a whip core consisting of first curing, then cutting into strips, then soaking the strips in a potash solution to swell, then saturating with a coloring material, then stretching, drying, compressing laterally, and finishing.

2. The method of making a whip core of fish skin consisting of curing, then cutting into strips, then swelling and coloring the strips, then stretching, drying, compressing transversely, and finishing.

GEORGE E. WHIPPLE.

Witnesses:
F. E. LAY,
F. A. SANFORD.